(12) United States Patent
Chien

(10) Patent No.: US 11,503,515 B2
(45) Date of Patent: Nov. 15, 2022

(54) USER EQUIPMENT AND BASE STATION FOR MOBILE COMMUNICATION SYSTEM

(71) Applicant: Institute For Information Industry, Taipei (TW)

(72) Inventor: Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 260 days.

(21) Appl. No.: 16/824,687

(22) Filed: Mar. 19, 2020

(65) Prior Publication Data

US 2020/0351728 A1 Nov. 5, 2020

Related U.S. Application Data

(60) Provisional application No. 62/841,787, filed on May 1, 2019.

(51) Int. Cl.
*H04W 36/00* (2009.01)
*H04W 56/00* (2009.01)
*H04W 36/08* (2009.01)

(52) U.S. Cl.
CPC ....... *H04W 36/0072* (2013.01); *H04W 36/08* (2013.01); *H04W 56/001* (2013.01)

(58) Field of Classification Search
None
See application file for complete search history.

(56) References Cited

U.S. PATENT DOCUMENTS

| 10,462,713 | B2 | 10/2019 | Damnjanovic et al. |
| 2008/0318578 | A1* | 12/2008 | Worrall ............... H04W 36/02 455/437 |
| 2013/0029707 | A1* | 1/2013 | Virta ................. H04B 17/309 455/507 |
| 2013/0279433 | A1 | 10/2013 | Dinan |
| 2015/0223124 | A1* | 8/2015 | Wang ................ H04W 24/08 455/436 |
| 2016/0227505 | A1 | 8/2016 | Loehr et al. |
| 2018/0020472 | A1* | 1/2018 | Lin ................... H04W 36/0055 |

OTHER PUBLICATIONS

Office Action to the corresponding Taiwan Patent Application rendered by the Taiwan Intellectual Property Office dated Feb. 26, 2021, 10 pages (including English translation).

* cited by examiner

Primary Examiner — Saba Tsegaye
(74) Attorney, Agent, or Firm — Skaar Ulbrich Macari, P.A.

(57) ABSTRACT

A user equipment (UE) and a base station (BS) for a mobile communication system are provided. The UE obtains a first timing advance (TA) value of a source BS, and receives a radio resource control (RRC) connection reconfiguration message for a handover from the source BS to a target BS. The UE calculates a receiving time difference between a receiving time of two synchronization signals respectively transmitted by the source BS and the target BS, and calculates a reference time difference according to first reference time information of the source BS and second reference time information of the target BS. The UE calculates a second TA value of the target BS based on the first TA value, the receiving time difference and the reference time difference.

20 Claims, 15 Drawing Sheets

USER EQUIPMENT AND BASE STATION FOR MOBILE COMMUNICATION SYSTEM

PRIORITY

This application claims priority to U.S. Provisional Patent Application No. 62/841,787 filed on May 1, 2019, which is hereby incorporated by reference in its entirety.

FIELD

The present invention relates to a user equipment (UE) and a base station (BS) for a mobile communication system. More particularly, for performing a handover from the source BS to the target BS, the UE calculates a timing advance (TA) value of the target BS based on the TA value of the source BS and the time differences between the source BS and the target BS.

BACKGROUND

With the rapid development of wireless communication technologies, wireless communication has found wide application in people's life, and people's demand for wireless communication is increasing. The next generation of mobile communication system (which is generally referred to as the 5G mobile communication system currently) has proposed new service types, e.g., Ultra-reliable and Low Latency Communication (URLLC), Enhanced Mobile Broadband (eMBB) communication, and Massive Machine Type Communication (mMTC).

According to a conventional handover procedure from a source BS to a target BS, the UE receives a handover indication from the source BS first, and then performs a random access channel (RACH) procedure by transmitting a preamble to the target BS for obtaining a timing advance value of the target BS so as to achieve uplink synchronization with the target BS for subsequent uplink data transmission. However, since the RACH procedure will cause transmission latency, the conventional handover procedure would not meet the low latency transmission requirement of the URLLC service to support 0 ms handover and mobility robustness.

Even a RACH-less handover has been proposed for shortening the latency during the handover procedure, such RACH-less handover is restricted to a synchronized clock timing between the target BS and the source BS. It means that the RACH-less handover only works when the clock timing of the target BS is synchronized with the clock timing of the source BS so that the UE can evaluate the timing advance value of the target BS based on the reference time information broadcasted by the source BS and the target BS.

Accordingly, an urgent need exists in the art to provide a RACH-less handover mechanism for the UE to perform a RACH-less handover procedure from the source BS to the target BS in the case that the clock timing of the target BS is unsynchronized with the clock timing of the source BS.

SUMMARY

An objective herein is to provide a RACH-less handover mechanism, which makes the UE calculate a receiving time difference between the receiving times of two synchronization signals respectively transmitted by the source BS and the target BS, calculate a reference time difference according to first reference time information of the source BS and second reference time information of the target BS, and calculate a timing advance (TA) value of the target BS based on the first TA value of the source BS, the receiving time difference and the reference time difference after receiving a radio resource control (RRC) connection reconfiguration message for a handover from the source BS to the target BS. As a result, the UE is able to perform the RACH-less handover from the source BS to the target BS in the case that the clock timing of the source BS and the clock timing of the target BS are not synchronized with each other.

The disclosure includes a user equipment (UE) for a mobile communication system. The UE comprises a transceiver and a processor. The processor is electrically connected to the transceiver, and is configured to execute the following operations: obtaining a first timing advance (TA) value of a source base station (BS); receiving a radio resource control (RRC) connection reconfiguration message from the source BS via the transceiver for a handover from the source BS to a target BS indicated by the RRC connection reconfiguration message, a target clock timing of the target BS being unsynchronized with a source clock timing of the source BS; calculating a receiving time difference between a first receiving time of a first synchronization signal transmitted by the source BS and a second receiving time of a second synchronization signal transmitted by the target BS; receiving a piece of first reference time information of the source BS and a piece of second reference time information of the target BS, the first reference time information indicating a first transmitting time at a first frame boundary of the source BS, the second reference time information indicating a second transmitting time at a second frame boundary of the target BS; calculating a reference time difference between the first transmitting time and the second transmitting time; and calculating a second TA value of the target BS based on the first TA value, the receiving time difference and the reference time difference.

The disclosure further includes a base station (BS) for a mobile communication system. The BS is a source BS for a user equipment (UE) to perform a handover therefrom to a target BS. The BS comprises a transceiver, a network interface and a processor. The processor is electrically connected to the transceiver and the network interface, and is configured to execute the following operations: receiving a piece of receiving time information of an uplink reference signal from the target BS via the network interface, the receiving time information being generated by the target BS when measuring an uplink reference signal transmitted by the UE; calculating a propagation delay time of the target BS based on a receiving time indicated by the receiving time information and a transmitting time at which the UE transmits the uplink reference signal to the BS; receiving a piece of reference time information from the target BS via the network interface, the reference time information indicating a second reference time of the target BS; calculating a reference time difference based on a first reference time of the BS and the second reference time of the target BS; calculating a second TA value of the target BS based on the propagation delay time and the reference time difference; and transmitting the second TA value of the target BS to the UE via the transceiver.

The disclosure also includes a base station (BS) for a mobile communication system. The BS is a target BS for a user equipment (UE) to perform a handover thereto from a source BS. A target clock timing of the BS is unsynchronized with a source clock timing of the source BS. The BS comprises a transceiver, a network interface and a processor. The processor is electrically connected to the transceiver and the network interface, and is configured to execute the following operations: measuring an uplink reference signal transmitted by the UE achieving uplink synchronization with the source BS via the transceiver; recording a receiving time of the uplink reference signal; receiving a piece of transmitting time information from the source BS via the network interface, the transmitting time information indicating a transmitting time at which the UE transmits the uplink reference signal to the source BS; calculating a propagation delay time based on the receiving time and the transmitting time; receiving a piece of reference time information of the source BS from the source BS via the network interface, the reference time information indicating of a first reference time of the source BS; calculating a reference time difference based on the first reference time of the source BS and a second reference time of the BS; calculating a second TA value of the BS based on the propagation delay time, and the reference time difference; and transmitting the second TA value to the source BS via the network interface for the source BS to forward the second TA value to the UE.

The detailed technology and preferred embodiments implemented for the present invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular environment, example, embodiment, applications or implementations described in these example embodiments. Therefore, description of these example embodiments is only for purpose of illustration rather than to limit the present invention.

It shall be appreciated that in the following embodiments and the attached drawings, elements unrelated to the present invention are omitted from depiction; and dimensional relationships among individual elements in the attached drawings are illustrated only for ease of understanding, but not to limit the actual scale.

Figure 1:
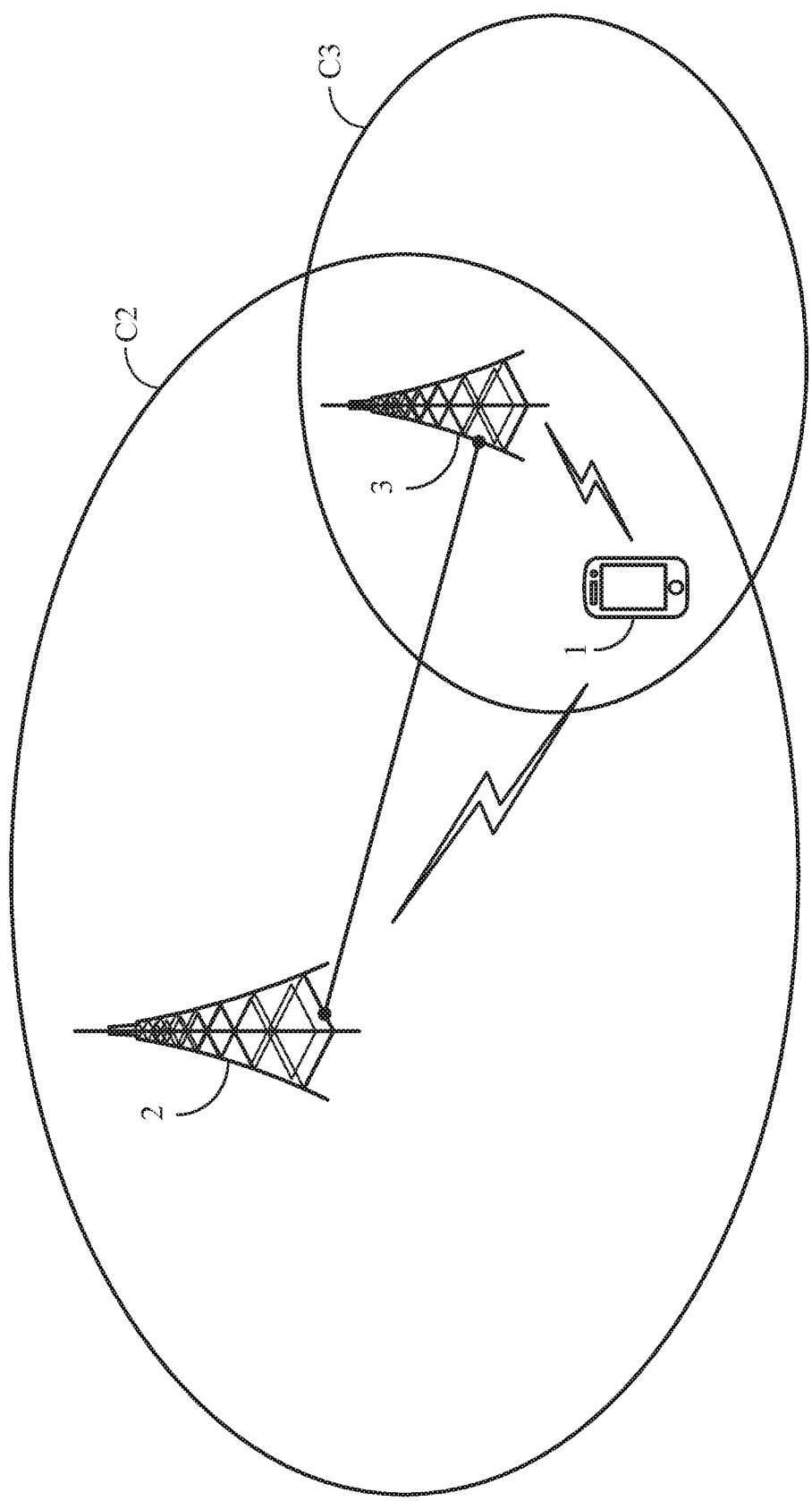
FIG. 1 depicts an implementation scenario of a mobile communication system according to the present invention.
Figure 2:
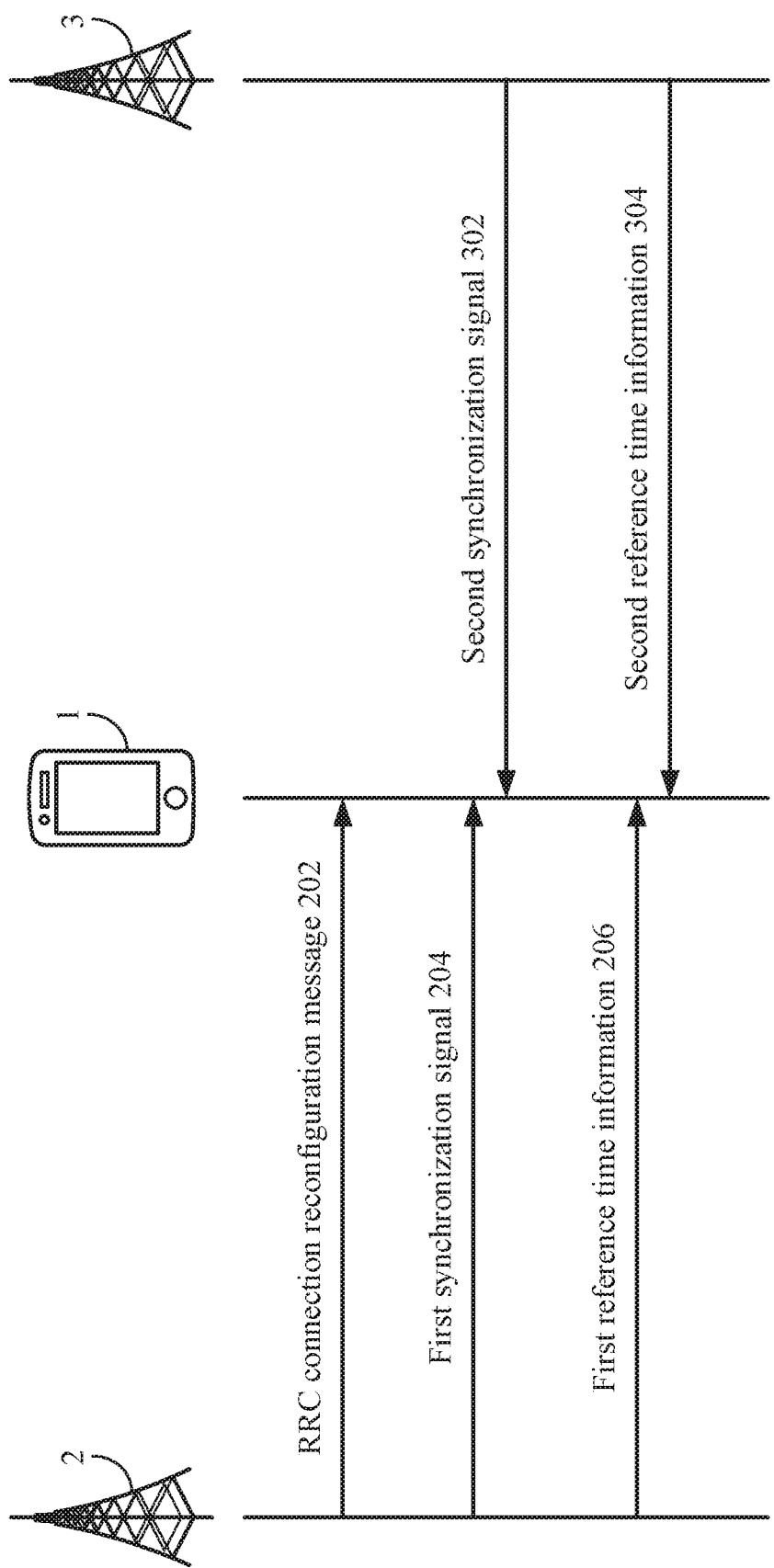
FIG. 2 is a schematic view of signal transmission according to the present invention.

A first embodiment of the present invention is as shown in FIGS. 1-2. For simplification of the description, only the signal transmissions among a single UE 1, a source BS 2 and a target BS 3 are depicted as the examples to describe how the UE 1 perform random access channel (RACH)-less handover with low latency from the source BS 2 to the target BS 3 in the case that the clock timing of the target BS 3 is unsynchronized with the clock timing of the source BS 2. The components and the functions of the components relevant to the UE 1, the source BS 2 and the target BS 3 will be further described in the embodiments corresponding to FIG. 13 to FIG. 15, respectively. It shall be appreciated by those of ordinary skill in the art that the UE 1 can also perform the RACH-less handover from the source BS 2 to other target BSs by executing similar operations as described hereinafter, and thus it will not be further described herein.

The mobile communication system may be the next generation of mobile communication system (broadly called the 5G mobile communication system currently) or any mobile communication systems based on the orthogonal frequency division multiple access (OFDMA) technology. The following description is based on the 5G mobile communication system to illustrate the present invention; however, how to extend the technical means of the present invention to be applied to other OFDMA-based mobile communication systems shall be appreciated by those of ordinary skill in the art, and thus will be not further described herein.

FIG. 1 depicts an implementation scenario of a mobile communication system according to the present invention. As shown in FIG. 1, in the mobile communication system, the source BS 2 has a signal coverage C2, the target BS 3 has a signal coverage C3, and the UE 1 is located within both the signal coverages C2, C3 of the source BS 2 and the target BS 3. The UE 1 may be a smart phone, a tablet computer or any wireless communication device, e.g., a UE supporting an ultra-reliable low latency communication (URLLC) service (also called the URLLC UE) or supporting any service with the requirement of low latency in the handover procedure, especially supporting 0 ms handover, but not limited thereto.

The UE 1 is connected to the source BS 2, so the UE 1 already obtained a first timing advance (TA) value of the source BS 2 and achieved the uplink synchronization with the source BS 2 according to the first TA value. When the UE 1 moves to the edge area of the signal coverage C2 and goes into the signal coverage C3, the signal quality and the signal strength of the signals received from the source BS 2 would become weaker, and a handover will then be triggered. In order to shorten transmission latency, the handover procedure of the present invention is RACH-less, especially in the case that the clock timing of the target BS 3 is unsynchronized with the clock timing of the source BS 2. That is to say, the UE 1 of the present invention does not need to perform the RACH procedure with the target BS 3 during the handover procedure to save the signaling even the clock timing of the target BS 3 is unsynchronized with the clock timing of the source BS 2. How the UE 1 of the present invention is able to obtain a TA value of the target BS 3 for achieving uplink synchronization with the target BS 3 without the RACH procedure will be described in detail as follows.

Please refer to FIG. 2, the UE 1 receives a radio resource control (RRC) connection reconfiguration message 202 for the handover indication from the source BS 2 to the target BS 3. The RRC connection reconfiguration message 202 is generated by the source BS 2 for instructing the UE 1 to perform the handover from the source BS 2 to the target BS 3. Afterwards, the UE 1 receives a first synchronization signal 204 from the source BS 2 and a second synchronization signal 302 from the target BS 3. Each of the first synchronization signal 204 and the second synchronization signal 302 may be a primary synchronization signal (PSS) and a secondary synchronization signal (SSS) carried in the synchronization signal block (SSB). The UE 1 calculates a receiving time difference between a first receiving time of the first synchronization signal 204 and a second receiving time of the second synchronization signal 302 so that the UE 1 can derive a delay time of the target BS 3 relative to the source BS 2 according to the receiving time difference.

If the UE 1 evaluates the second TA value of the target BS 3 merely based on the first TA value of the source BS 2 and the receiving time difference, the second TA value of the target BS 3 will not be accurate enough because the clock timing of the target BS 3 is unsynchronized with the clock timing of the source BS 2. Therefore, to compensate the effect caused by the unsynchronized clock timing between the source BS 2 and the target BS 3, the UE 1 further receives a piece of first reference time information 206 from the source BS 2 and a piece of second reference time information 304 from the target BS 3. The first reference time information 206 indicates a first transmitting time at a first frame boundary of the source BS 2, and the second reference time information 304 indicates a second transmitting time at a second frame boundary of the target BS 3. The first transmitting time of the source BS 2 is associated with a first time stamp included in one of a first system information block (SIB) and a first unicast radio resource control (RRC) message transmitted by the source BS 2, and the second transmitting time of the target BS 3 is associated with a second time stamp of one of a second SIB and a second unicast RRC message transmitted by the target BS 3.

Next, the UE 1 calculates a reference time difference between the first transmitting time and the second transmitting time and calculates the second TA value of the target BS 3 based on the first TA value, the receiving time difference and the reference time difference so that the effect caused by the unsynchronized clock timing between the source BS 2 and the target BS 3 can be compensated. Specifically, the second TA value is calculated from the first TA value by adding the receiving time difference and the reference time difference relative to the source BS 2, where each of the receiving time difference and the reference time difference could be positive or negative.

Figure 3:
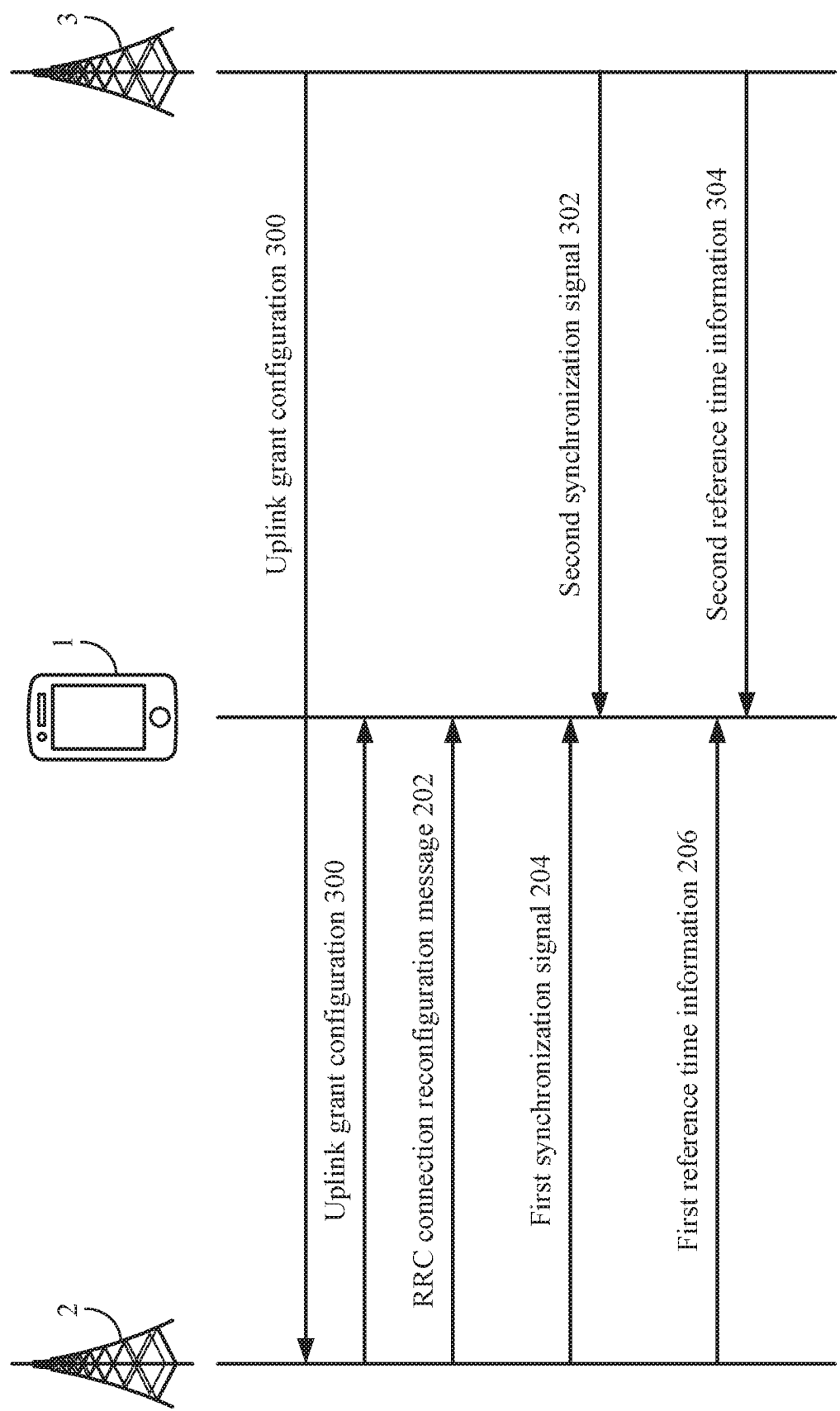
FIG. 3 is a schematic view of signal transmission according to the present invention.
Figure 4:
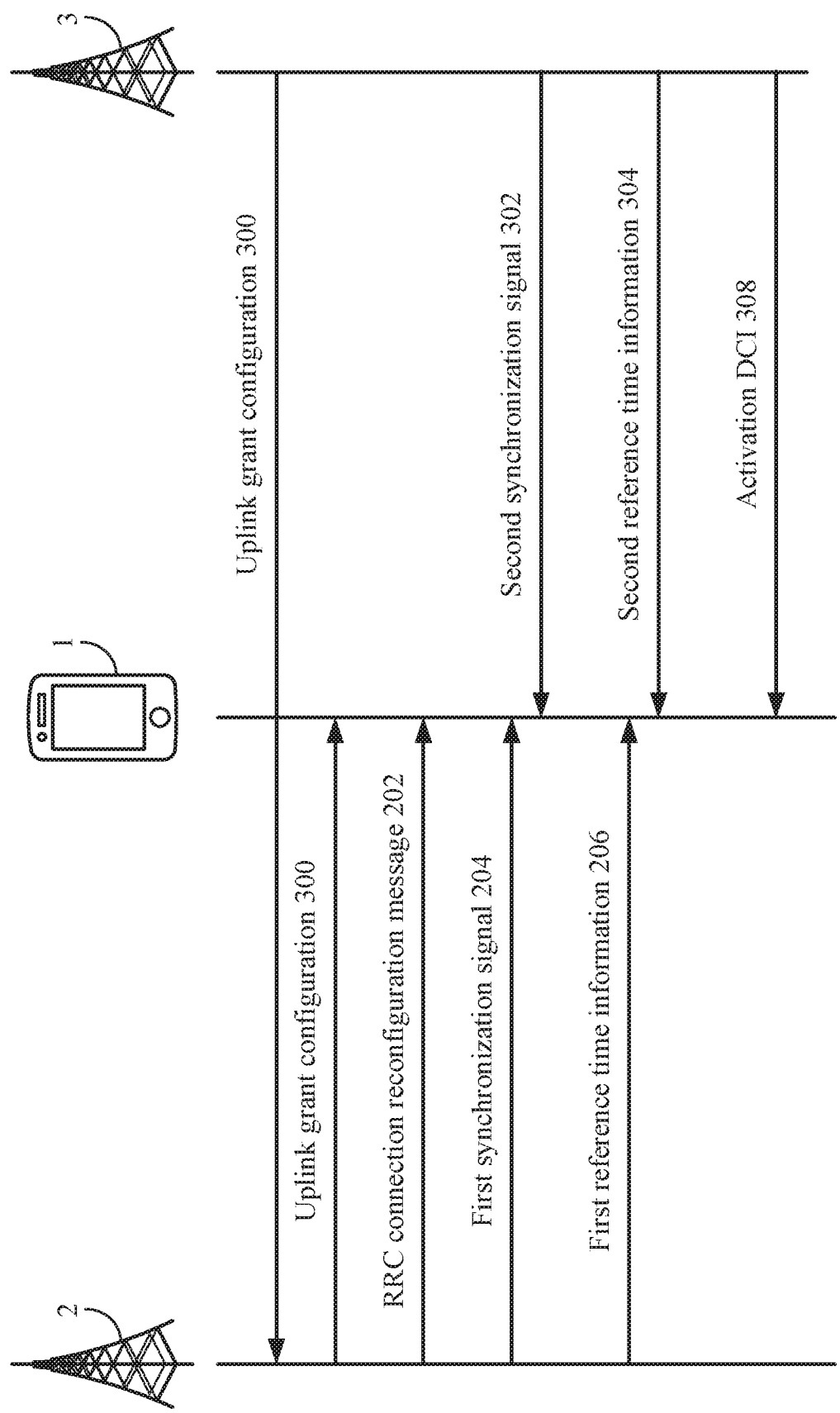
FIG. 4 is a schematic view of signal transmission according to the present invention.

A second embodiment of the present invention is as shown in FIGS. 3-4. The second embodiment is an extension of the first embodiment. After calculating the second TA value of the target BS 3, the UE 1 has achieved the uplink synchronization with the target BS 3. Because the handover is RACH-less, the UE 1 would not receive the random access response (RAR) message from the target BS 3 to grant the uplink resource indicated by the RAR message. In the present invention, the target BS 3 would transmit its uplink grant configuration 300 to the source BS 2 first (e.g., via the X2 interface), and the source BS 2 would forward the uplink grant configuration 300 of the target BS 3 to the UE 1. In other words, the uplink grant configuration determined by the target BS 3 can be transmitted to the UE 1 through the forwarding by the source BS 2.

The uplink grant configuration 200 can be carried in an RRC message or downlink control information (DCI). However, in another embodiment, the uplink grant configuration 300 forwarded by the source BS 2 may carried in the RRC connection reconfiguration message 202 (i.e., the uplink grant configuration 300 can be merged into the RRC connection reconfiguration message 202 transmitted by the source BS 2).

Besides, in other embodiments, after the handover procedure is completed, the UE 1 receives activation DCI 308 from the target BS 3, and activate the uplink grant configuration 300 carried in an RRC message, as shown in FIG. 4. The activation DCI 308 is associated with a configured grant identifier, e.g., configured grant radio network temporary identifier (CG-RNTI). In detail, the uplink grant configuration 300 may be associated one or more uplink resources allocated by the target BS 3 so that the UE 1 can use the uplink resources for uplink transmission after receiving the activation DCI 308.

Figure 5:
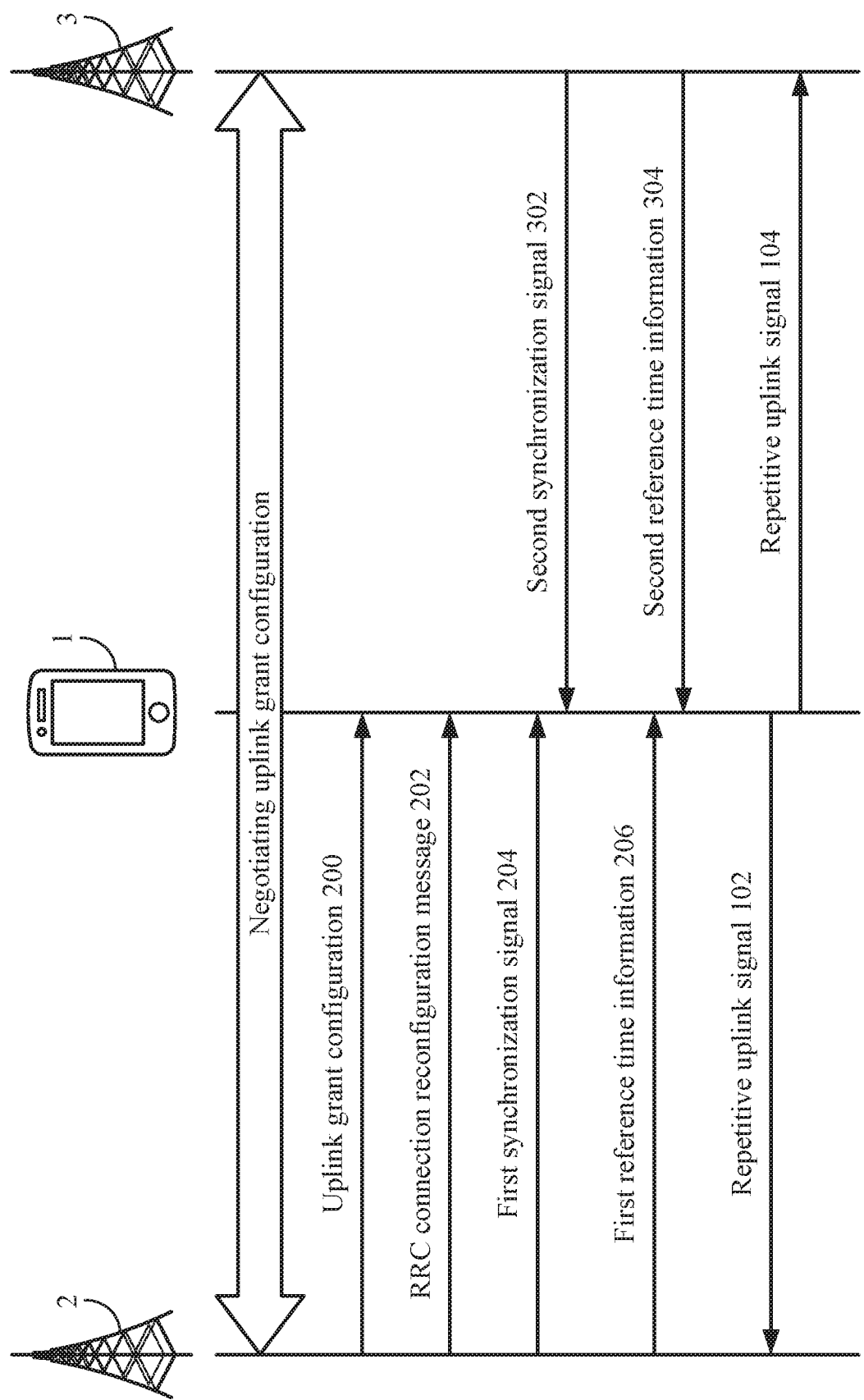
FIG. 5 is a schematic view of signal transmission according to the present invention.

A third embodiment of the present invention is as shown in FIG. 5. The third embodiment is an extension of the first embodiment and the second embodiment. Different from the second embodiment, in this embodiment, the uplink grant configuration 200 is determined by the source BS 2 in cooperation with the target BS 3.

In detail, if the source BS 2 indicates the UE 1 the handover from the source BS 2 to the target BS 3 when the UE 1 is performing repetition transmission with the source BS 2 based on the previously received uplink grant configuration from the BS 2, it is necessary to prevent the repetition transmission from being interrupted. As a result, the source BS 2 and the target BS 3 should negotiate the uplink grant configuration 200 to make the UE 1 able to continuously transmit the repetitive uplink signals after completing the handover procedure from the source BS 2 to the target BS 3.

Specifically, the uplink grant configuration 200 indicates a repetition transmission number and a set of resource for transmitting repetitive uplink signals 102 to the source BS 2 and a set of resource for transmitting repetitive uplink signals 104 to the target BS 3 so that the UE 1 can continuously perform the remaining repetition transmission with the target BS 3 after the handover.

In this situation, the UE 1 transmits the repetitive uplink signals 102 (a part of total repetitive uplink signals) to the source BS 2 according to the uplink grant configuration 200, and transmits the repetitive uplink signals 104 (a remaining part of total repetitive uplink signals) to the target BS 3 according to the uplink grant configuration 200 after completing the handover from the source BS 2 to the target BS 3, as shown in FIG. 5.

Similarly, the uplink grant configuration 200 can be carried in an RRC message or downlink control information (DCI). Furthermore, in another embodiment, the uplink grant configuration 200 may carried in the RRC connection reconfiguration message 202.

Figure 6:
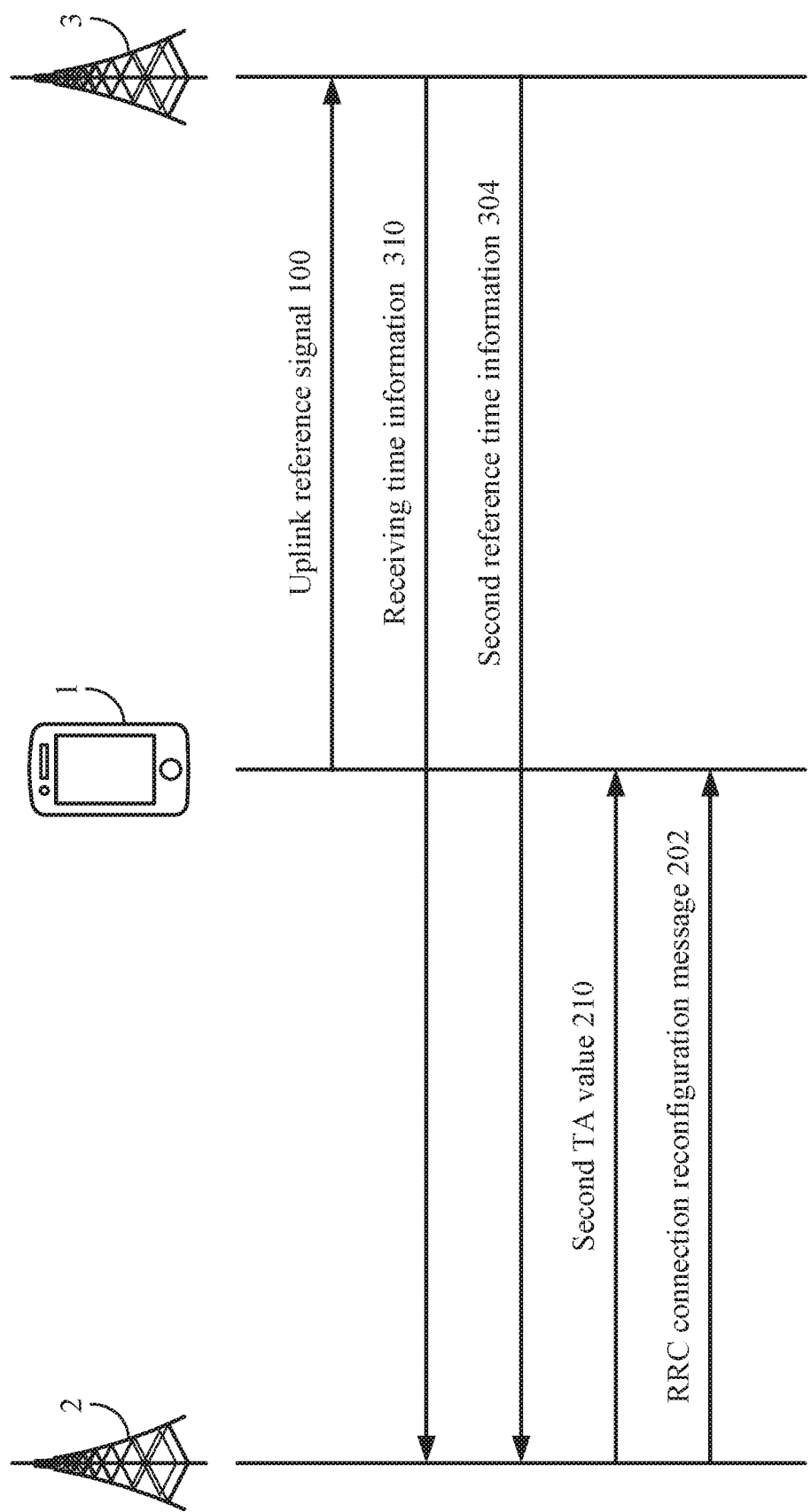
FIG. 6 is a schematic view of signal transmission according to the present invention.

A fourth embodiment of the present invention is as shown in FIG. 6. Different from the first embodiment, in this embodiment, the second TA value of the target BS 3 is calculated by the source BS 2.

Specifically, the UE 1 transmits an uplink reference signal 100 such as a demodulation reference signal (DMRS) or a sounding reference signal (SRS). The target BS 3 will measure the uplink reference signal 100 transmitted by the UE 1. After measuring the uplink reference signal 100, the target BS 3 records the receiving time of the uplink reference signal 100 and transmits the receiving time information 310, including the receiving time of the uplink reference signal 100, to the source BS 2. Since the transmitting time of the uplink reference signal 100 transmitted by the UE 1 was known by the BS 2, the BS 2 can calculate the propagation delay time between the target BS 3 and the UE 2 based the receiving time and the transmitting time of the uplink reference signal 100.

However, due to the unsynchronized clock timing between the source BS 2 and the target BS 3, the calculated propagation delay time is not accurate. Thus, after calculating the propagation delay time, the source BS 2 also needs to calculate the reference time difference based on the first reference time of the source BS 2 and the second reference time of the target BS 3 for compensating the inaccuracy of the propagation delay time so that the source BS 2 could calculate the second TA value of the target BS 3.

In detail, the source BS 2 receives the second reference time information 304 from the target BS 3. The second reference time information 304 indicates the second reference time at a second frame boundary of the target BS 3. Similarly, the first reference time is associated with a first local clock of the source BS 2 indicated by a first time stamp included in one of a first SIB and a first unicast RRC message transmitted by the source BS 2, and the second reference time is associated with a second local clock of the target B S 3 indicated by a second time stamp included in one of a second SIB and a second unicast RRC message transmitted by the target BS 3. It shall be appreciated that the order of transmitting the second reference time information 304 and the receiving time information 310 would be exchanged.

The source BS 2 calculates the second TA value of the target BS 3 based on the propagation delay time and the reference time difference, and transmits the second TA value 210 of the target BS 3 to the UE 1 so that the effect caused by the unsynchronized clock timing between the source BS 2 and the target BS 3 can be compensated. Specifically, the second TA value 210 is calculated from the propagation delay time by adding the reference time difference relative to the source BS 2, where the reference time difference could be positive or negative. Likewise, the second TA value 210 may be carried in one of the RRC message, DCI, and the RRC connection reconfiguration message 202.

In another embodiment, the reference time difference may be calculated by a backhaul device (not shown) connected to the source BS 2 and the target BS 3, and be provided to the source BS 2 so that the source BS 2 calculates the second TA value after receiving the reference time difference from the backhaul device.

Figure 7:
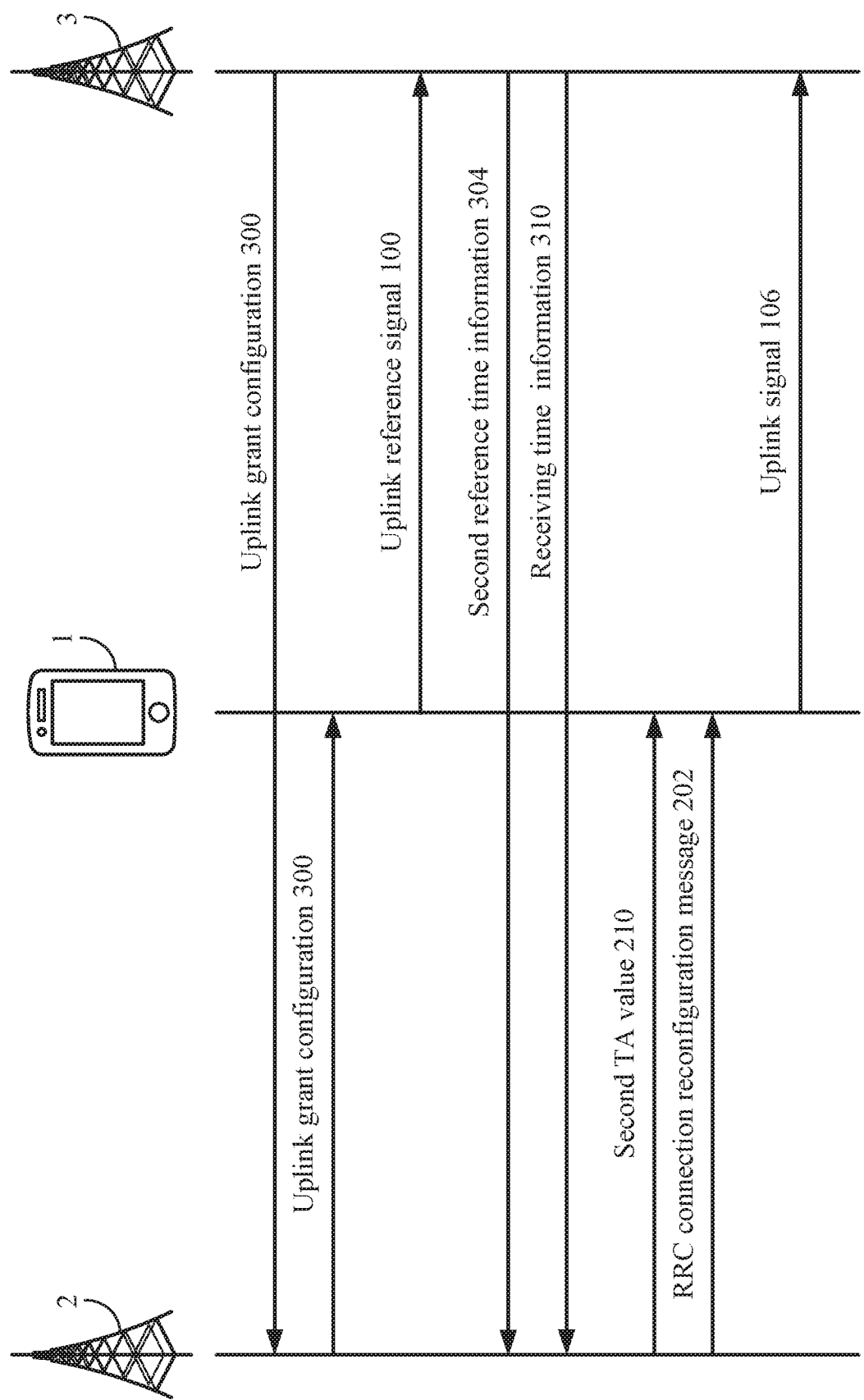
FIG. 7 is a schematic view of signal transmission according to the present invention.

A fifth embodiment of the present invention is as shown in FIG. 7. The fifth embodiment is an extension of the fourth embodiment. As described in the second embodiment, because the handover is RACH-less, the target BS 3 cannot directly transmit its uplink grant configuration 300 to the UE 1. In this case, the target BS 3 can only transmit its uplink grant configuration 300 to the source BS 2 to make the source BS 2 forward the uplink grant configuration 300 to the UE 1. Therefore, in this embodiment, the source BS 2 further receives the uplink grant configuration 300 of the target BS 3 from the target BS 3, and forwards the uplink grant configuration 300 of the target BS 3 to the UE 1 to make the UE 1 transmit the uplink signal 106 to the target BS 3 based on the uplink grant configuration 300.

Figure 8:
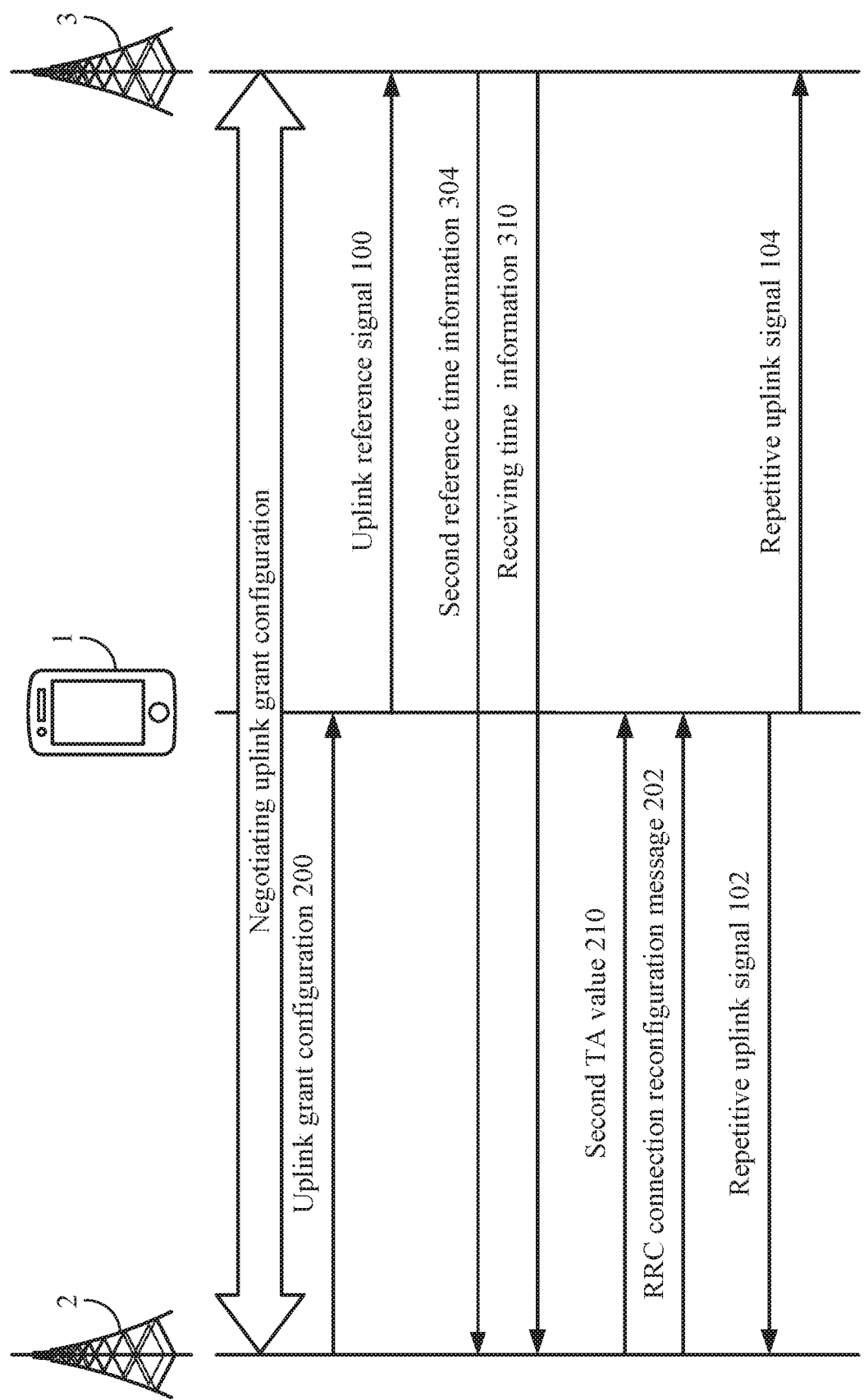
FIG. 8 is a schematic view of signal transmission according to the present invention.

A sixth embodiment of the present invention is as shown in FIG. 8. The sixth embodiment is an extension of the fourth embodiment and the fifth embodiment. Different from the fifth embodiment, in this embodiment, the uplink grant configuration 200 is determined by the source BS 2 in cooperation with the target BS 3. As described in the third embodiment, the source BS 2 and the target BS 3 can negotiate and determine the uplink grant configuration 200 together. The uplink grant configuration 200 indicates the repetition transmission number and the set of resource for receiving repetitive uplink signals 102 by the source BS 2 and a set of resource for receiving repetitive uplink signals 104 by the target BS 3 so that the UE 1 can continuously perform the remaining repetition transmission with the target BS 3 after the handover.

In this situation, the UE 1 transmits the repetitive uplink signals 102 (a part of total repetitive uplink signals) to the source BS 2 according to the uplink grant configuration 200, and transmits the repetitive uplink signals 104 (a remaining part of total repetitive uplink signals) to the target BS 3 according to the uplink grant configuration 200 after completing the handover from the source BS 2 to the target BS 3, as shown in FIG. 8.

Figure 9:
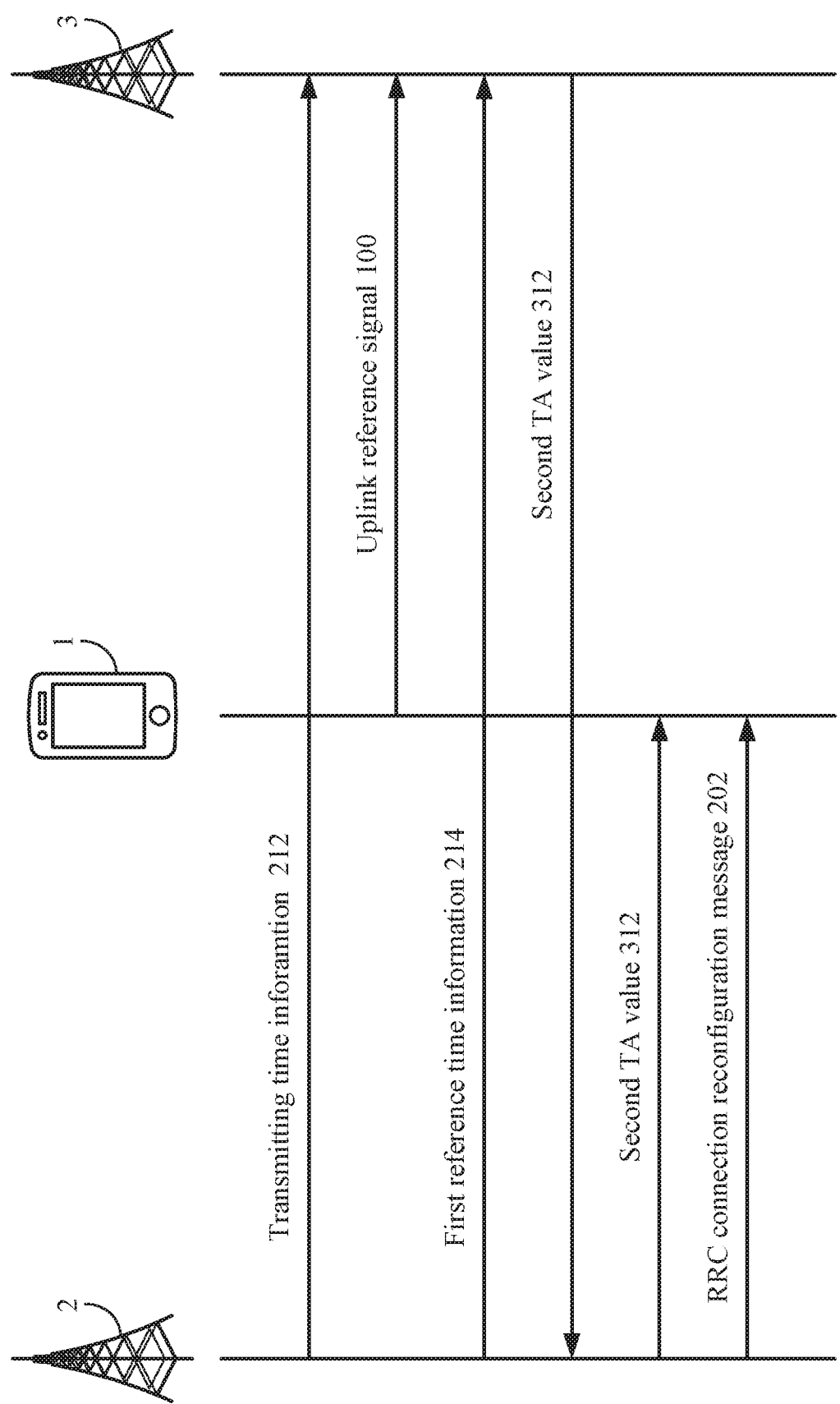
FIG. 9 is a schematic view of signal transmission according to the present invention.

A seventh embodiment of the present invention is as shown in FIG. 9. Different from the first embodiment, in this embodiment, the second TA value of the target BS 3 is calculated by the target BS 3 itself. The UE 1 has achieved the uplink synchronization with the source BS 2, and a target clock timing of the target BS 3 is unsynchronized with a source clock timing of the source BS 2.

To calculate the second TA value of the target BS 3, the target BS 3 measures the uplink reference signal 100 such as the DMRS or the SRS transmitted by the UE 1, and records the receiving time of the uplink reference signal 100. Next, the target BS 3 receives a transmitting time information 212 from the source BS 2. The transmitting time information indicates the transmitting time at which the UE 1 transmits the uplink reference signal 100 to the source BS 2. It shall be appreciated that the order of transmission of the uplink reference signal 100 and the transmitting time information 212 would be exchanged.

Afterwards, the target BS 3 calculates the propagation delay time between the target BS 3 and the UE 2 based on the receiving time and the transmitting time of the uplink reference signal 100. However, due to the unsynchronized clock timing between the source BS 2 and the target BS 3, the calculated propagation delay time is not accurate. Thus, after calculating the propagation delay time, the target BS 3 receives a first reference time information 214, indicating a first reference time of the source BS 2, from the source BS 2. The first reference time is associated with a first local clock of the source BS 2 indicated by a first time stamp included in one of a first SIB and a first unicast RRC message transmitted by the source BS 2, and the second reference time is associated with a second local clock of the target BS 3 indicated by a second time stamp included in one of a second SIB and a second unicast RRC message transmitted by the target BS 3.

The target BS 3 calculates the reference time difference based on the first reference time of the source BS 2 and the second reference time of the target BS 3. Afterwards, the target BS 3 calculates the second TA value of the target BS 3 based on the propagation delay time and the reference time difference, and transmits the second TA value 312 to the source BS 2 so that the source BS 2 forwards the second TA value 312 to the UE 1 accordingly. Specifically, the second TA value 312 is calculated from the propagation delay time by adding the reference time difference relative to the source BS 2, where the reference time difference could be positive or negative. Likewise, the second TA value 312 transmitted by the source BS 2 may be carried in one of the RRC message, DCI, and the RRC connection reconfiguration message 202.

Figure 10:
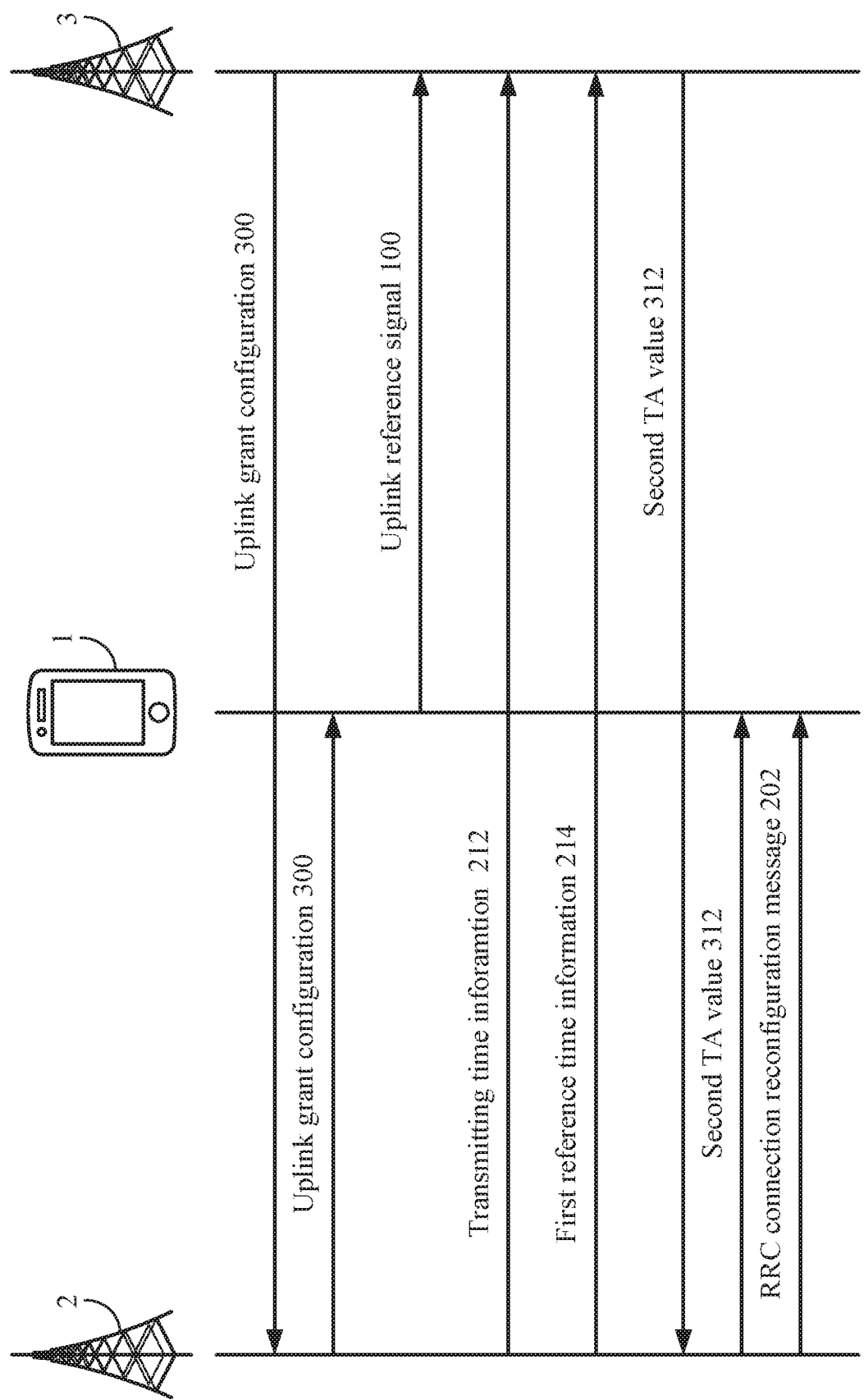
FIG. 10 is a schematic view of signal transmission according to the present invention.
Figure 11:
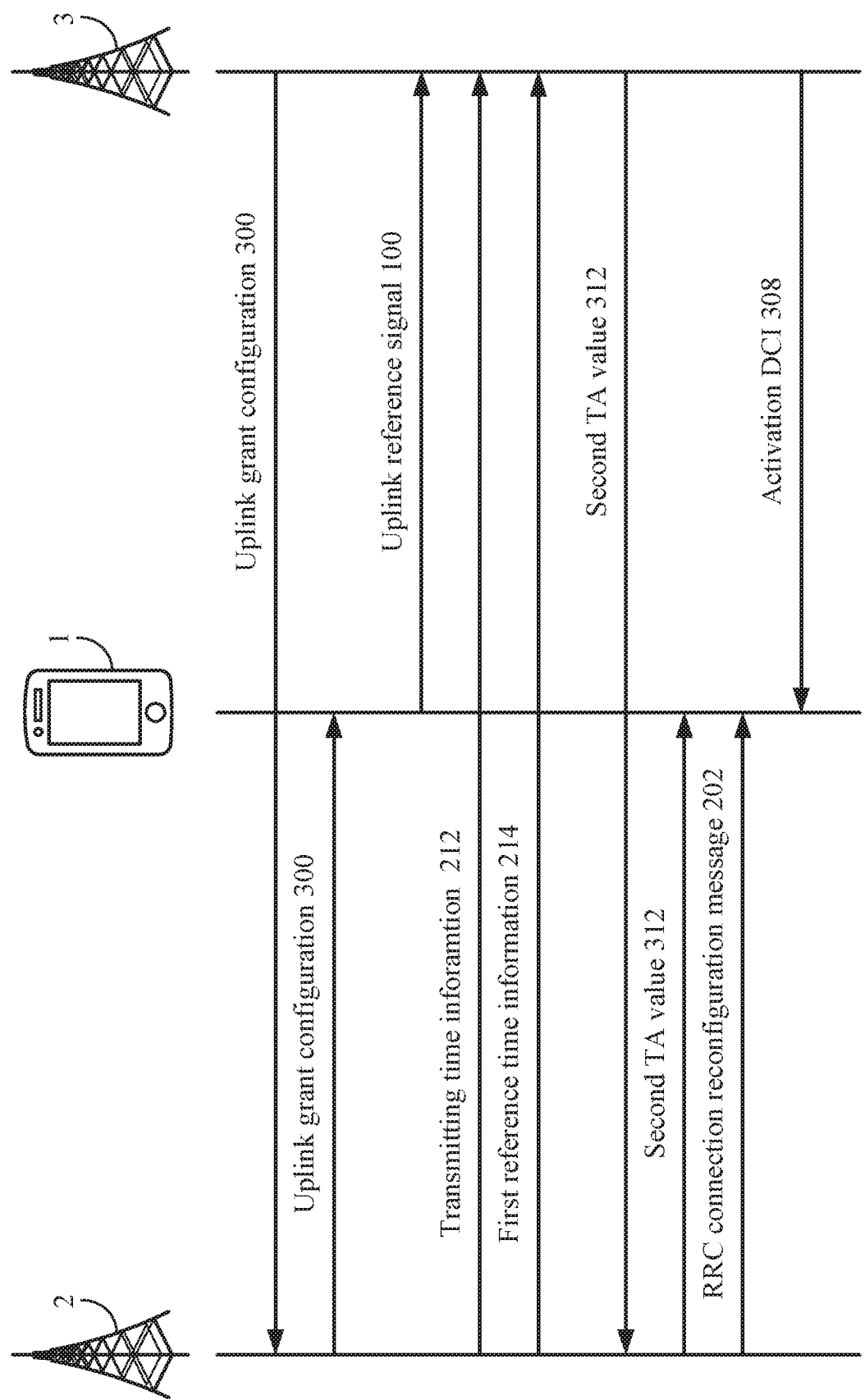
FIG. 11 is a schematic view of signal transmission according to the present invention.

An eighth embodiment of the present invention is as shown in FIGS. 10-11. The eighth embodiment is an extension of the seventh embodiment. Likewise, since the handover is RACH-less, the target BS 3 can only transmit its uplink grant configuration 300 to the source BS 2 to make the source BS 2 forward the uplink grant configuration 300 to the UE 1. Therefore, in this embodiment, after the target BS 3 determines its uplink grant configuration 300, the target BS 3 transmits the uplink grant configuration 300 to the source BS 2 for the source BS 2 to forward the uplink grant configuration 300 to the UE 1.

In another embodiment, after the handover procedure is completed, the target BS 3 transmits activation DCI 308 associated with a configured grant identifier to the UE 1 to activate the uplink grant configuration 300 carried in the RRC message, as shown in FIG. 11.

Figure 12:
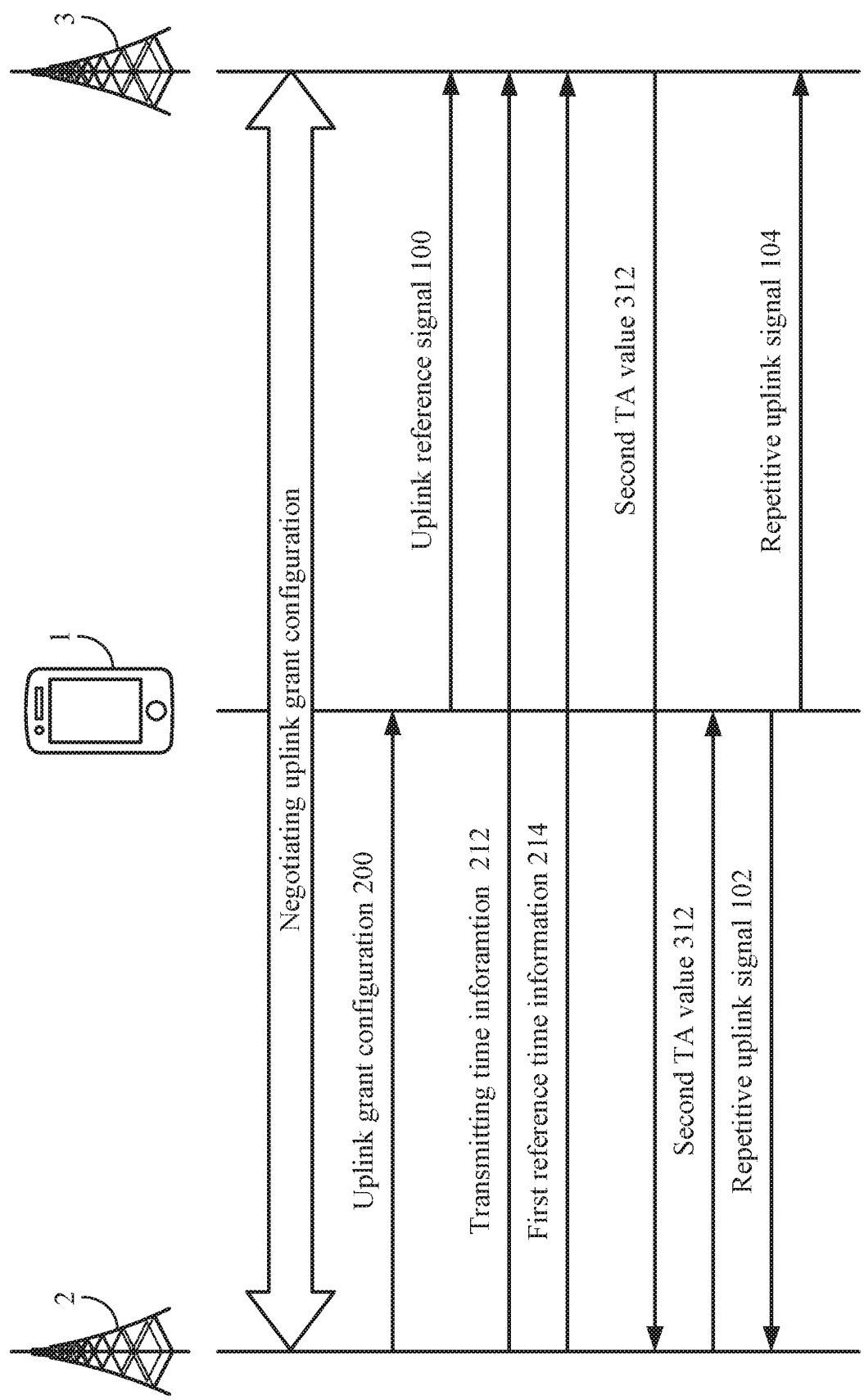
FIG. 12 is a schematic view of signal transmission according to the present invention.

A ninth embodiment of the present invention is as shown in FIG. 12. The ninth embodiment is an extension of the seventh embodiment. Different from the eighth embodiment, in this embodiment, the target BS 3 negotiate the uplink grant configuration 200 with the source BS 2, and determines the uplink grant configuration 200 in cooperation with the source BS 2. Then, the determined uplink grant configuration 200 is transmitted to the UE 1 by the source BS 2. The uplink grant configuration 200 indicates the repetition transmission number and the set of resource for receiving repetitive uplink signals 102 by the source BS 2 and a set of resource for receiving repetitive uplink signals 104 by the target BS 3 so that the UE 1 can continuously perform the remaining repetition transmission with the target BS 3 after the handover.

In this situation, the UE 1 transmits the repetitive uplink signals 102 (a part of total repetitive uplink signals) to the source BS 2 according to the uplink grant configuration 200, and transmits the repetitive uplink signals 104 (a remaining part of total repetitive uplink signals) to the target BS 3 according to the uplink grant configuration 200 after completing the handover from the source BS 2 to the target BS 3, as shown in FIG. 12.

Figure 13:
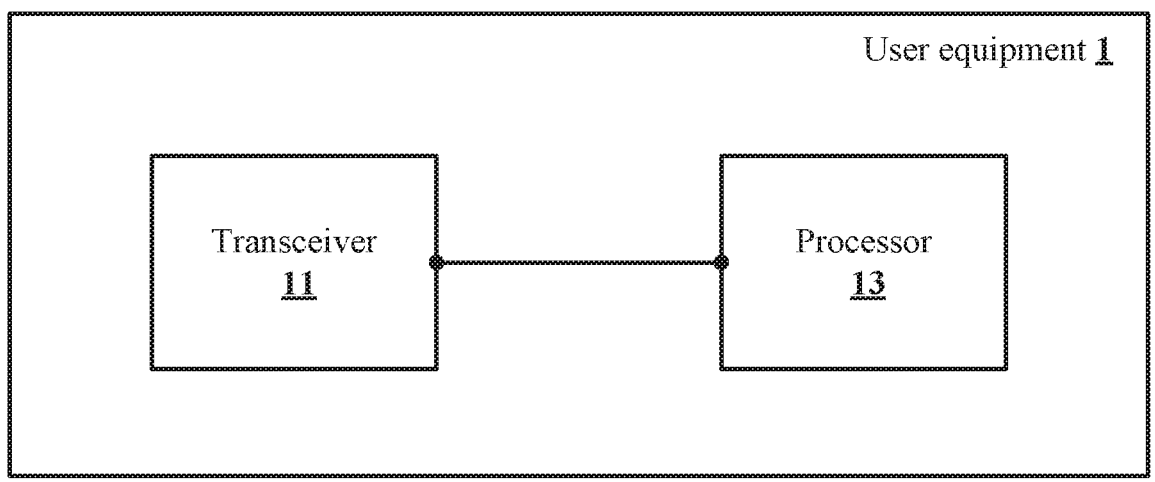
FIG. 13 is a schematic view of the UE 1 according to the present invention.

A tenth embodiment of the present invention is as shown in FIG. 13, which is a schematic view of the UE 1 according to the present invention. The UE 1 comprises a transceiver 11 and a processor 13. The processor 13 is electrically connected to the transceiver 11. For simplifying the description, other components of the UE 1 such as the storage, the housing, the power supply module and other components that are less relevant to the present invention are omitted from depiction in the drawings. The processor 13 may be any of various processors, Central Processing Units (CPUs), microprocessors, digital signal processors, or other computing devices known to those of ordinary skill in the art.

Corresponding to the first embodiment, the processor 13 obtains the first TA value of the source BS 2, and receives the RRC connection reconfiguration message from the source BS 2 via the transceiver 11 for the handover from the source BS 2 to a target BS 3 indicated by the RRC connection reconfiguration message. The target clock timing of the target BS 3 is unsynchronized with the source clock timing of the source BS 2. The processor 13 calculates the receiving time difference between the first receiving time of the first synchronization signal transmitted by the source BS 2 and the second receiving time of the second synchronization signal transmitted by the target BS 3.

The processor 13 receives a piece of first reference time information of the source BS 2 and a piece of second reference time information of the target BS 3. The first reference time information indicates the first transmitting time at the first frame boundary of the source BS 2, and the first transmitting time of the source BS 2 is associated with the first time stamp included in one of the first SIB and the first unicast RRC message transmitted by the source BS 2. The second reference time information indicates the second transmitting time at the second frame boundary of the target BS 3, and the second transmitting time of the target BS 3 is associated with the second time stamp of one of the second SIB and the second unicast RRC message transmitted by the target BS 3.

The processor 13 calculates the reference time difference between the first transmitting time and the second transmitting time. The processor 13 calculates the second TA value of the target BS 3 based on the first TA value, the receiving time difference and the reference time difference.

Corresponding to the second embodiment, the processor 13 receives the uplink grant configuration of the target BS 3 from the source BS 2 via the transceiver 11. The uplink grant configuration is carried in one of an RRC message, DCI, and the RRC connection reconfiguration message. The uplink grant configuration is determined by the target BS 3.

In other embodiments, the processor 13 receives activation DCI from the target BS 3 via the transceiver 11, and activates the uplink grant configuration carried in the RRC message. The activation DCI is associated with the configured grant identifier.

Corresponding to the third embodiment, the processor 13 receives the uplink grant configuration from the source BS 2 via the transceiver 11. The uplink grant configuration is determined by the source BS 2 in cooperation with the target BS 3, and the uplink grant configuration indicates the repetition transmission number and a set of resource for transmitting a part of repetitive uplink signals to the source BS 2 and a set of resource for transmitting a remaining part of repetitive uplink signals to the target BS 3. Then, the processor 13 transmits the part of repetitive uplink signals to the source BS 2 via the transceiver 11 according to the uplink grant configuration; and transmits the remaining part of the repetitive uplink signals to the target BS 3 via the transceiver 11 according to the uplink grant configuration after completing the handover from the source BS 2 to the target BS 3.

Figure 14:
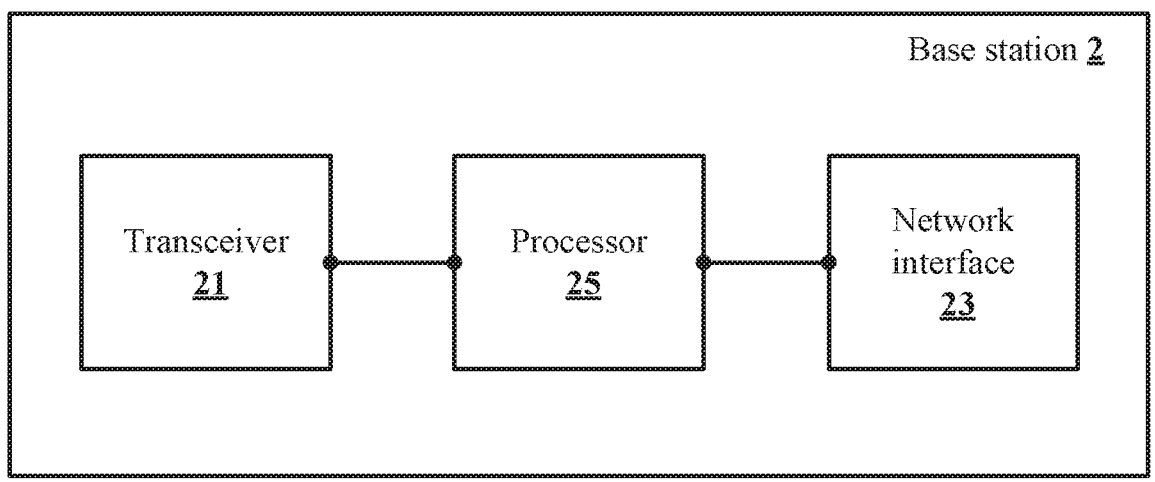
FIG. 14 is a schematic view of the BS 2 according to the present invention.

An eleventh embodiment of the present invention is as shown in FIG. 14, which is a schematic view of the BS 2 according to the present invention. The BS 2 in the 5G mobile communication system is usually called a "gNB." The BS 2 is the source BS 2 as described in the foregoing embodiments for the UE 1 to perform a handover therefrom to the target BS 3. The BS 2 comprises a transceiver 21, a network interface 23 and a processor 25. The processor 25 is electrically connected to the transceiver 21 and the network interface 23. It shall be appreciated that, for simplifying the description, other components of the BS 2 such as the storage, the housing, the power supply module and other components that are less relevant to the present invention are omitted from depiction in the drawings. The processor 25 may be any of various processors, Central Processing Units (CPUs), microprocessors, digital signal processors, or other computing devices known to those of ordinary skill in the art.

Corresponding to the fourth embodiment, the processor 25 receives a piece of receiving time information of an uplink reference signal from the target BS 3 via the network interface 23. The receiving time information is generated by the target BS 3 when measuring an uplink reference signal transmitted by the UE 1. The uplink reference signal is one of the DMRS and the SRS.

Next, the processor 25 calculates a propagation delay time of the target BS 3 based on a receiving time indicated by the receiving time information and a transmitting time at which the UE 1 transmits the uplink reference signal to the BS 2. The processor 25 receives a piece of reference time information (i.e., the second reference time information 304) from the target BS 3 via the network interface 23. The reference time information indicates a second reference time of the target BS 3.

Afterwards, the processor 25 calculates the reference time difference based on the first reference time of the BS 2 and the second reference time of the target BS 3. The first reference time may be associated with the first local clock of the BS 2 indicated by the first time stamp included in one of the first SIB and the first unicast RRC message transmitted by the BS 2, and the second reference time may be associated with the second local clock of the target BS 3 indicated by the second time stamp included in one of the second SIB and the second unicast RRC message transmitted by the target BS 3.

The processor 25 calculates the second TA value of the target BS 3 based on the propagation delay time information and the reference time difference. The processor 25 transmits the second TA value of the target BS to the UE via the transceiver 21. The second TA value may be carried in one of an RRC message, downlink control information (DCI), and an RRC connection reconfiguration message.

Corresponding to the fifth embodiment, the processor 25 receives the uplink grant configuration determined by the target BS 3 from the target BS 3 via the network interface 23, and forwards the uplink grant configuration of the target BS 3 to the UE 1 via the transceiver 23 to make the UE 1 transmit the uplink signal to the target BS 3 based on the uplink grant configuration. The uplink grant configuration is carried in one of the RRC message, DCI, and the RRC connection reconfiguration message.

Corresponding to the sixth embodiment, the processor 25 transmits the uplink grant configuration to the UE 1 via the transceiver 23. The uplink grant configuration is determined by the BS 2 in cooperation with the target BS 3, and the uplink grant configuration indicates the repetition transmission number and a set of resources for receiving repetitive uplink signals from the UE. The processor 25 receives a part of the repetitive uplink signals from the UE via the transceiver 21 based on the uplink grant configuration.

Figure 15:
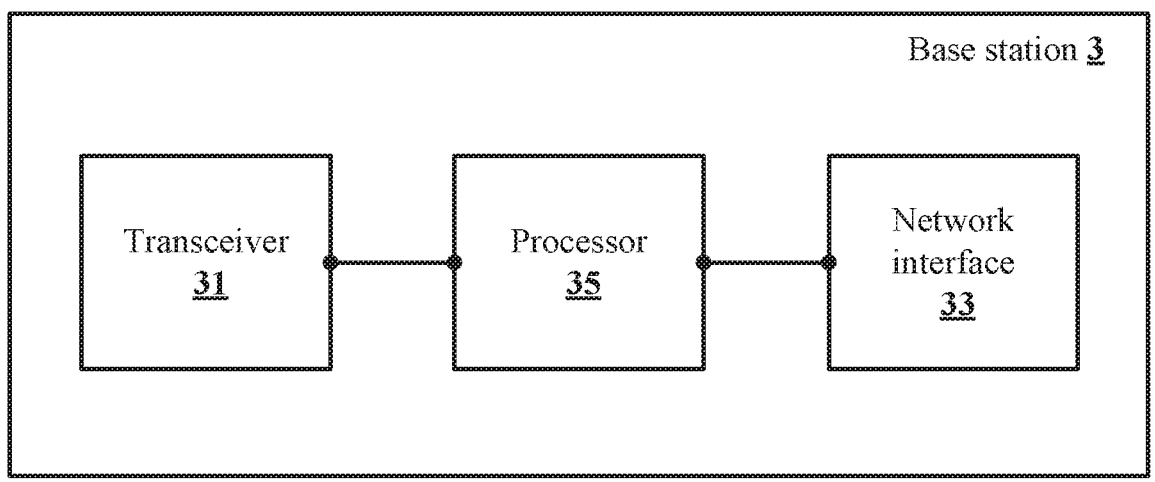
FIG. 15 is a schematic view of the BS 3 according to the present invention.

A twelfth embodiment of the present invention is as shown in FIG. 15, which is a schematic view of the BS 3 according to the present invention. The BS 3 in the 5G mobile communication system is usually called a "gNB." The BS 3 is the target BS 3 as described in foregoing embodiments for the UE 1 to perform a handover thereto from the source BS 2. The target clock timing of the BS 3 is unsynchronized with a source clock timing of the source BS 2. The UE 1 has achieved the uplink synchronization with the source BS 2. The BS 3 comprises a transceiver 31, a network interface 33 and a processor 35. The processor 35 is electrically connected to the transceiver 31 and the network interface 33. It shall be appreciated that, for simplifying the description, other components of the BS 3 such as the storage, the housing, the power supply module and other components that are less relevant to the present invention are omitted from depiction in the drawings. The processor 35 may be any of various processors, CPUs, microprocessors, digital signal processors, or other computing devices known to those of ordinary skill in the art.

Corresponding to the seventh embodiment, the processor 35 measures an uplink reference signal transmitted by the UE 1 achieving uplink synchronization with the source BS 2 via the network interface 33. The processor 35 records a receiving time of the uplink reference signal. The uplink reference signal is one of the DMRS and the SRS. Next, the processor 35 receives a piece of transmitting time information from the source BS 2 via the network interface 33. The transmitting time information indicates a transmitting time at which the UE 1 transmits the uplink reference signal to the source BS 2. The processor 35 calculates a propagation delay time based on the receiving time and the transmitting time.

The processor 35 receives a piece of reference time information (i.e., the first reference time information 214) from the source BS 2 via the network interface 33. The reference time information indicates a first reference time of the source BS 2. The first reference time is associated with a first local clock of the source BS 2 indicated by the first time stamp included in one of the first SIB and the first unicast RRC message transmitted by the source BS 2. Afterwards, the processor 35 calculates the reference time difference based on the first reference time of the source BS 2 and a second reference time of the BS 3. The second reference time is associated with the second local clock of the BS 3 indicated by the second time stamp included in one of the second SIB and a second unicast RRC message transmitted by the BS 3.

The processor 35 calculates the second TA value of the BS 3 based on the propagation delay time information and the reference time difference, and transmits the second TA value to the source BS 2 via the network interface 33 for the source BS 2 to forward the second TA value to the UE 1. The second TA value is carried in one of an RRC message, DCI, and an RRC connection reconfiguration message.

Corresponding to the eighth embodiment, the processor 35 determines the uplink grant configuration of the BS 3, and transmits the uplink grant configuration to the source BS 2 via the network interface 33 for the source BS 2 to forward the uplink grant configuration to the UE 1.

In other embodiments, the processor 35 further transmits activation DCI associated with the configured grant identifier to the UE 1 via the transceiver 31 to activate the uplink grant configuration carried in the RRC message.

Corresponding to the ninth embodiment, the processor 35 determines the uplink grant configuration in cooperation with the source BS 2. The uplink grant configuration indicates the repetition transmission number and a set of resources for receiving repetitive uplink signals from the UE 1. The processor 35 transmits the uplink grant configuration to the UE 1 via the source BS 2, and receives a remaining part of repetitive uplink signals from the UE 1 via the transceiver 31 based on the uplink grant configuration after the UE 1 completes the handover from the source BS 2 to the BS 3.

According to the above descriptions, the present invention makes the UE, the source BS or target BS calculate the TA value for the UE to achieve uplink synchronization with the target BS without the random access procedure with the target BS when performing the handover from the source BS to the target BS. Therefore, the UE of the present invention is able to achieve the RACH-less handover from the source BS to the target BS in the case that the clock timing of the source BS and the clock timing of the target BS are not synchronized with each other.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE) for a mobile communication system, comprising:
   a transceiver; and
   a processor electrically connected to the transceiver, being configured to execute the following operations:
      obtaining a first timing advance (TA) value of a source base station (BS);
      receiving a radio resource control (RRC) connection reconfiguration message from the source BS via the transceiver for a handover from the source BS to a target BS indicated by the RRC connection reconfiguration message, a target clock timing of the target BS being unsynchronized with a source clock timing of the source BS;
      calculating a receiving time difference between a first receiving time of a first synchronization signal transmitted by the source BS and a second receiving time of a second synchronization signal transmitted by the target BS;
      receiving first reference time information of the source BS and second reference time information of the target BS, the first reference time information indicating a first transmitting time at a first frame boundary of the source BS, the second reference time information indicating a second transmitting time at a second frame boundary of the target BS;
      calculating a reference time difference between the first transmitting time and the second transmitting time; and
      calculating a second TA value of the target BS based on the first TA value, the receiving time difference and the reference time difference.

2. The user equipment of claim 1, wherein the first transmitting time of the source BS is associated with a first time stamp included in one of a first system information block (SIB) and a first unicast radio resource control (RRC) message transmitted by the source BS, and the second transmitting time of the target BS is associated with a second time stamp of one of a second SIB and a second unicast RRC message transmitted by the target BS.

3. The user equipment of claim 1, wherein the processor further executes the following operation:
   receiving an uplink grant configuration of the target BS from the source BS via the transceiver, wherein the uplink grant configuration is determined by the target BS.

4. The user equipment of claim 3, wherein the uplink grant configuration is carried in one of an RRC message, downlink control information (DCI), and the RRC connection reconfiguration message.

5. The user equipment of claim 3, wherein the processor further executes the following operations:

receiving activation DCI from the target BS via the transceiver, the activation DCI being associated with a configured grant identifier; and
activating the uplink grant configuration carried in an RRC message.

6. The user equipment of claim 1, wherein the processor further executes the following operations:
   receiving an uplink grant configuration from the source BS via the transceiver, wherein the uplink grant configuration is determined by the source BS in cooperation with the target BS, the uplink grant configuration indicating a repetition transmission number and a set of resource for transmitting a part of repetitive uplink signals to the source BS and a set of resource for transmitting a remaining part of repetitive uplink signals to the target BS;
   transmitting the part of repetitive uplink signals to the source BS via the transceiver according to the uplink grant configuration; and
   transmitting the remaining part of the repetitive uplink signals to the target BS via the transceiver according to the uplink grant configuration after completing the handover from the source BS to the target BS.

7. A base station (BS) for a mobile communication system, the BS being a source BS for a user equipment (UE) to perform a handover therefrom to a target BS, the BS comprising:
   a transceiver;
   a network interface; and
   a processor electrically connected to the transceiver and the network interface, being configured to execute the following operations:
      receiving time information of an uplink reference signal from the target BS via the network interface, the receiving time information being generated by the target BS when measuring an uplink reference signal transmitted by the UE;
      calculating a propagation delay time of the target BS based on a receiving time indicated by the receiving time information and a transmitting time at which the UE transmits the uplink reference signal to the BS;
      receiving reference time information from the target BS via the network interface, the reference time information indicating a second reference time of the target BS;
      calculating a reference time difference based on a first reference time of the BS and the second reference time of the target BS;
      calculating a second TA value of the target BS based on the propagation delay time and the reference time difference; and
      transmitting the second TA value of the target BS to the UE via the transceiver.

8. The base station of claim 7, wherein the second TA value is carried in one of an RRC message, downlink control information (DCI), and an RRC connection reconfiguration message.

9. The base station of claim 7, wherein the uplink reference signal is one of a demodulation reference signal (DMRS) and a sounding reference signal (SRS).

10. The base station of claim 7, wherein the first reference time is associated with a first local clock of the BS indicated by a first time stamp included in one of a first system information block (SIB) and a first unicast RRC message transmitted by the BS, and the second reference time is associated with a second local clock of the target BS indicated by a second time stamp included in one of a second SIB and a second unicast RRC message transmitted by the target BS.

11. The base station of claim 7, wherein the processor further executes the following operations:
   receiving an uplink grant configuration determined by the target BS from the target BS via the network interface; and
   forwarding the uplink grant configuration of the target BS to the UE via the transceiver to make the UE transmit an uplink signal to the target BS based on the uplink grant configuration.

12. The base station of claim 11, wherein the uplink grant configuration is carried in one of an RRC message, downlink control information (DCI), and the RRC connection reconfiguration message.

13. The base station of claim 7, wherein the processor further executes the following operations:
   transmitting an uplink grant configuration to the UE via the transceiver, the uplink grant configuration being determined by the BS in cooperation with the target BS, the uplink grant configuration indicating a repetition transmission number and a set of resources for receiving repetitive uplink signals from the UE; and
   receiving a part of the repetitive uplink signals from the UE via the transceiver based on the uplink grant configuration.

14. A base station (BS) for a mobile communication system, the BS being a target BS for a user equipment (UE) to perform a handover thereto from a source BS, a target clock timing of the BS being unsynchronized with a source clock timing of the source BS, the BS comprising:
   a transceiver;
   a network interface; and
   a processor electrically connected to the transceiver and the network interface, being configured to execute the following operations:
   measuring an uplink reference signal transmitted by the UE achieving uplink synchronization with the source BS via the transceiver;
   recording a receiving time of the uplink reference signal;
   receiving transmitting time information from the source BS via the network interface, the transmitting time information indicating a transmitting time at which the UE transmits the uplink reference signal to the source BS;
   calculating a propagation delay time based on the receiving time and the transmitting time;
   receiving reference time information of the source BS from the source BS via the network interface, the reference time information indicating of a first reference time of the source BS;
   calculating a reference time difference based on the first reference time of the source BS and a second reference time of the BS;
   calculating a second TA value of the BS based on the propagation delay time, and the reference time difference; and
   transmitting the second TA value to the source BS via the network interface for the source BS to forward the second TA value to the UE.

15. The base station of claim 14, wherein the second TA value is carried in one of an RRC message, downlink control information (DCI), and an RRC connection reconfiguration message.

16. The base station of claim 14, wherein the uplink reference signal is one of a demodulation reference signal (DMRS) and a sounding reference signal (SRS).

17. The base station of claim 14, wherein the first reference time is associated with a first local clock of the source BS indicated by a first time stamp included in one of a first system information block (SIB) and a first unicast RRC message transmitted by the source BS, and the second reference time is associated with a second local clock of the BS indicated by a second time stamp included in one of a second SIB and a second unicast RRC message transmitted by the BS.

18. The base station of claim 14, wherein the processor further executes the following operations:
   determining an uplink grant configuration of the BS; and
   transmitting the uplink grant configuration to the source BS via the network interface for the source BS to forward the uplink grant configuration to the UE.

19. The base station of claim 18, wherein the processor further transmits activation downlink control information (DCI) associated with a configured grant identifier to the UE via the transceiver to activate the uplink grant configuration carried in an RRC message.

20. The base station of claim 14, wherein the processor further executes the following operations:
   determining an uplink grant configuration in cooperation with the source BS, the uplink grant configuration indicating a repetition transmission number and a set of resources for receiving repetitive uplink signals from the UE;
   transmitting the uplink grant configuration to the UE via the source BS; and
   receiving a remaining part of repetitive uplink signals from the UE via the transceiver based on the uplink grant configuration after the UE completes the handover from the source BS to the BS.

* * * * *